(12) United States Patent
Lukos

(10) Patent No.: US 7,614,439 B2
(45) Date of Patent: *Nov. 10, 2009

(54) ROLLER TUBE HAVING EXTERNAL SLOT FOR MOUNTING SHEET MATERIAL

(76) Inventor: Stephen Lukos, 1879 Litchfield Rd., Watertown, CT (US) 06795

( * ) Notice: Subject to any disclaimer, the term of this patent is extended or adjusted under 35 U.S.C. 154(b) by 229 days.

This patent is subject to a terminal disclaimer.

(21) Appl. No.: 11/368,030

(22) Filed: Mar. 3, 2006

(65) Prior Publication Data

US 2006/0207731 A1    Sep. 21, 2006

Related U.S. Application Data

(63) Continuation-in-part of application No. 10/959,444, filed on Oct. 5, 2004, now Pat. No. 7,111,662.

(51) Int. Cl.
*A47H 13/00* (2006.01)

(52) U.S. Cl. .................... 160/392; 160/310; 242/390.8; 242/587.1; 242/587.2

(58) Field of Classification Search ................. 160/392, 160/395, 383, 310, 405, 133, 23.1, 121.1, 160/24, 262, 72; 242/376, 407, 587.1, 587.2, 242/587.3, 374, 390.8, 390.9; 310/67 R
See application file for complete search history.

(56) References Cited

U.S. PATENT DOCUMENTS

| | | | |
|---|---|---|---|
| 165,935 A | 7/1875 | Knapp |
| 618,822 A | 2/1899 | Barr |
| 618,828 A | 2/1899 | Barr |
| 696,373 A | 3/1902 | Hutchison |
| 898,983 A | 9/1908 | Melick |
| 1,013,531 A | 1/1912 | Carmany |
| 1,099,021 A | 6/1914 | Campbell |
| 1,202,287 A | 10/1916 | Hartshorn |
| 1,450,520 A | 4/1923 | Smith |
| 1,515,040 A | 11/1924 | Hartshorn |
| 1,562,105 A | 11/1925 | McDonald |
| 2,336,189 A | 12/1943 | Price |

(Continued)

OTHER PUBLICATIONS

Sweets Catalog, 12492/MAR, BuyLine 4895, Mariak Industries, Inc., pp. 1-3.

(Continued)

*Primary Examiner*—David Purol
(74) *Attorney, Agent, or Firm*—Lipsitz & McAllister, LLC

(57) ABSTRACT

A roller tube has a tubular wall and a longitudinal axis. A channel runs longitudinally in an exterior surface of the tubular wall and is configured to receive an attachment insert for sheet material such as a solar shade, movie screen, decorative shade or the like. The channel has first and second side walls that extend from an interior portion of the tubular wall toward the exterior surface. The second side wall extends further away from the longitudinal axis of the roller tube than the first side wall. This creates a lip in the exterior surface of the roller tube, enabling the attachment insert to be mounted flush with the exterior surface of the roller tube and avoiding any bumps from being formed in the sheet material as it is wound around the tube. The tube wall varies in thickness and has a relatively thick section to accommodate the channel being formed therein.

17 Claims, 6 Drawing Sheets

U.S. PATENT DOCUMENTS

| | | | |
|---|---|---|---|
| 2,547,692 A | 4/1951 | Dazzo | |
| 3,329,195 A | 7/1967 | Kochanowski | |
| 3,724,524 A | 4/1973 | Potter | |
| 3,882,921 A | 5/1975 | Sandall | |
| 4,223,714 A | 9/1980 | Weinreich et al. | |
| 4,323,105 A | 4/1982 | Berman et al. | |
| 4,344,474 A | 8/1982 | Berman | |
| RE31,793 E | 1/1985 | Berman et al. | |
| 4,633,927 A * | 1/1987 | Labelle | 160/133 |
| 5,123,474 A | 6/1992 | Smith | |
| 5,230,377 A | 7/1993 | Berman | |
| 5,384,941 A | 1/1995 | Welser | |
| 5,540,269 A | 7/1996 | Plumer | |
| 5,566,741 A * | 10/1996 | Ogawara et al. | 160/297 |
| 6,164,428 A | 12/2000 | Berman et al. | |
| 6,237,667 B1 | 5/2001 | Fraczek et al. | |
| 6,402,110 B1 | 6/2002 | Berman et al. | |
| 6,817,399 B2 | 11/2004 | Berman et al. | |
| 7,111,662 B2 * | 9/2006 | Lukos | 160/392 |
| 2002/0088895 A1 * | 7/2002 | Savolainen et al. | 242/609.4 |
| 2004/0020603 A1 * | 2/2004 | Johansson et al. | 160/24 |
| 2005/0167058 A1 | 8/2005 | Walker et al. | |

OTHER PUBLICATIONS

Mariak Industries, Inc., Product Cut Sheet: Chain Operated Clutch Roller Shade System, pp. 1-2, www.mariak.com.
Mariak Industries, Inc., Product Cut Sheet: Motorized Roller Shade System, pp. 1-2, www.mariak.com.
Sweets Catalog, 12492/MAR, BuyLine 4895, Mariak Industries, Inc., pp. 1-3.
Mariak Industries, Inc., Product Cut Sheet: Chain Operated Clutch Roller Shade System, pp. 1-2, www.mariak.com.
Mariak Industries, Inc., Product Cut Sheet: Motorized Roller Shade System, pp. 1-2, www.mariak.com.

* cited by examiner

ROLLER TUBE HAVING EXTERNAL SLOT FOR MOUNTING SHEET MATERIAL

This application is a continuation-in-part of commonly owned, co-pending U.S. patent application Ser. No. 10/959,444 filed on Oct. 5, 2004.

BACKGROUND

The present invention relates to solar screens, awnings, movie screens, roller shades and other sheet materials that are wound on roller tubes, and more particularly, to a roller tube including an integral slot that maintains a smooth outside diameter for attaching the sheet material. The resulting roller tube allows the sheet material to be wound therearound without any bumps or other imperfections.

Roller shade systems make use of flexible shades supported by elongated roller tubes. For purposes of the present disclosure, the term "shades" is intended to encompass any type of sheet material dispensed from a roller, including movie screens, solar shades, awnings, decorative shades, etc. The roller tube, typically made from polymer, plastic, aluminum or steel, is rotatably supported and provides support for the flexible shade on the roller tube. Roller shades include manual shades having spring driven roller tubes and motorized shades having drive motors engaging the roller tube to rotatingly drive the tube. The drive motors for motorized shades include externally mounted motors engaging an end of the roller tube (e.g., via gears and/or chains or belts) and internal motors that are received within an interior defined by the tube. Manual pull chain drives could alternatively be provided.

Conventional roller shades have support systems that engage the opposite ends of the roller tube to provide the rotatable support that is required for winding and unwinding of the flexible shade. The support system includes a drive end support assembly having a coupler engaging the open end of the tube for rotation. The coupler is adapted to receive the drive shaft of a motor such that rotation of the drive shaft is transferred to the coupler for rotation of the tube. The motor is secured to a bracket for attachment of the roller shade system to the wall or ceiling of a structure, for example. A coupler engaging an opposite end of the roller tube could receive a motor drive shaft or, alternatively, could receive a rotatably supported shaft of an idler assembly.

In certain roller tube arrangements, the drive motor is inserted into the roller tube body. The drive motor includes a substantially circular outer shape that snuggly fits into the inside diameter of the cylinder shaped roller tube.

The roller tube serves to support and fix the screen material, such that the screen can wind and unwind in a smooth manner. It is important in the attachment of the screen to the roller tube outside diameter to align the screen perpendicular to the axis of rotation of the roller tube. If the screen is out-of-square alignment with the roller tube, then the screen will wind and unwind in an uneven manner. A screen that is out of alignment can bind and create unsightly wrinkles along the surface of the solar screen/awning that is undesirable.

The prior art roller tube designs have attempted to solve the problem of attachment of the screen to the roller tube in various ways. A common prior art technique of attachment is to use double sided adhesive tape along the outer surface of the roller tube. The double sided tape adheres to both the roller tube and the screen. This tape technique can result in a time consuming process that can yield screens that are out of alignment. Moreover, the tape can result in a raised surface on the roller tube exterior surface, thereby creating a bump in the fabric or other material wound around the roller tube. Even an incongruity as small as one ten-thousandth of an inch can create a bump that results in a permanent deformity of the sheet material. Such a bump will result in unsightly horizontal lines and/or wrinkles when the material is unwound from the roller tube. Moreover, thicker sheet materials accentuate the bumps. Various tape thickness have been tried in order to blend the surface of the roller tube into the sheet material, but this has not been a satisfactory solution because it requires a very time consuming manufacturing process.

Another prior art technique of attachment is to form a groove in the roller tube exterior for insertion of the screen material. The groove acts to align the roller tube material sufficiently. This technique may include a separate bar that can clamp onto and or into the groove in the roller tube such that the screen material is clamped between the bar and the groove.

A substantial drawback of the prior art roller tube and groove techniques is that the groove formed in the roller tube creates a protrusion that bulges into the inside diameter of the roller tube. The protrusion into the prior art roller tubes inhibits the insertion of a drive motor into the roller tube. With the protrusion, the roller tube cannot accept the substantially circular drive motor without modification to the drive motor housing. Modification of the drive motor makes the installation more costly and less practical.

Other prior art attempts to maintain the circular inside diameter involve the use of additional clamping bars to the exterior of the roller tube. These techniques lose the advantage of the groove to provide a true orthogonal baseline to align the screen material, and create a bump in the material rolled around the tube.

It would be advantageous to provide a method and an apparatus to ensure that roller tube and screen material are in proper orthogonal alignment while being able to utilize interior drive motors without the added costs and complexity of the prior art systems. The present invention provides the aforementioned and other advantages.

What is needed in the art is a roller tube having an external slot for mounting the screen without forming protrusions in the roller tube interior or bumps in the material wound around the tube. It would be further advantageous to provide such roller tubes with a small diameter, and which will accommodate standard off the shelf motors that are readily available.

SUMMARY

A roller tube is provided that has a tubular wall and a longitudinal axis. The roller tube includes a first end and a second end opposite said first end. A channel runs longitudinally in an exterior surface of the tubular wall and is configured to receive an attachment insert for sheet material. The channel comprises first and second side walls that extend from an interior portion of the tubular wall toward the exterior surface. The second side wall extends further away from the longitudinal axis than the first side wall to create a lip in the exterior surface. The tube wall varies in thickness and has a relatively thick section to accommodate the channel being formed therein. The exterior of the roller tube in an illustrated embodiment is eccentric with respect to the interior thereof due to the varying thickness of the tube wall.

In one disclosed embodiment, the interior of the roller tube has a circular profile, which can be adapted to snugly receive a motor having a substantially circular outer shape.

The channel can extend substantially from the first end to the second end of the roller tube. Moreover, the channel can, for example, be generally T-shaped. In such a case, the T-shape may be formed by a broad portion (the "top" of the T) with a leg extending therefrom. The leg of the T-shaped channel can extend away from the longitudinal axis of the roller tube, and be longer on one side thereof to provide the lip. With this implementation, the lip on the roller tube is configured to extend beyond the portion of the exterior surface that adjoins the first side wall by an amount adapted to accommodate the leg height of a T-shaped attachment insert when inserted in the channel.

In implementations where the channel is of a different shape, the lip can extend beyond the portion of the exterior surface that adjoins the first side wall by an amount adapted to accommodate the height of a corresponding attachment insert. In this manner, the attachment insert will be flush with the exterior surface when inserted in the channel.

Embodiments are disclosed where the roller tube is provided in combination with an attachment insert in the channel. In such an embodiment, a sheet material may be attached to the attachment insert (e.g., prior to the attachment insert being inserted in the channel). The channel and the attachment insert will typically have complimentary shapes, such as the aforementioned T-shape.

In a preferred embodiment, the attachment insert is undercut on an outer surface thereof to which the sheet material is attached. The undercut allows the sheet material to be mounted flush with the outer surface. Moreover, the roller tube can comprise a notch in the exterior surface thereof extending away from the channel toward a step in the exterior surface. The step defines the end of the notch, which allows the attachment insert to be mounted flush with the exterior surface.

A method is provided for attaching a sheet material to a roller tube. The roller tube has a longitudinal axis and includes a channel running longitudinally in an exterior surface thereof. The channel is configured to receive an attachment insert for sheet material. The channel is provided with first and second side walls that extend from an interior portion of said roller tube toward the exterior surface. The second side wall extends further away from the axis than the first side wall to create a lip in the exterior surface. The attachment insert is mounted in the channel flush with the exterior surface of the roller tube. A sheet material is mounted to the attachment insert in a manner that allows the sheet material to be wound around the roller tube without causing a bump in the material in the vicinity of the attachment insert.

The channel and attachment insert have complimentary T-shapes in the illustrated embodiment. The mounting step can comprise sliding the T-shaped attachment insert into the T-shaped channel. The sheet material may be taped to the attachment insert, or adhesively affixed thereto. Sewing and ultrasonic welding techniques can also be used.

BRIEF DESCRIPTION OF THE FIGURES

Referring now to the figures, wherein like elements are numbered alike.

DETAILED DESCRIPTION

The disclosure provides an exemplary roller tube for a solar screen, movie screen, awning or the like. The roller tube can include a tube body formed by a tube wall. The tube wall defines an interior of the roller tube and an exterior of the roller tube. The roller tube body defines a length between a first end and a second end. A surface feature, such as a channel (also referred to as a groove or slot) is formed in the tube wall at the exterior of the tube body. The surface feature is configured to receive a sheet material attachment insert flush with the exterior of the roller tube. In this manner, sheet material can be wound around the roller tube without causing a bump in the material in the vicinity of the attachment insert. The surface feature also does not create any protrusions into the interior of the tube body, such that the tube body can maintain a circular profile in the interior, if desired. The roller tube can be configured to support a sheet material wound around the roller tube body along the length of the body between the first and second ends of the body. The sheet material can comprise a solar screen for an awning. Alternatively, the sheet material can comprise a window shade material, awning material, canvas, plastic sheeting, screening, movie screen, or any other material adapted to be wound on a core.

Figure 1:
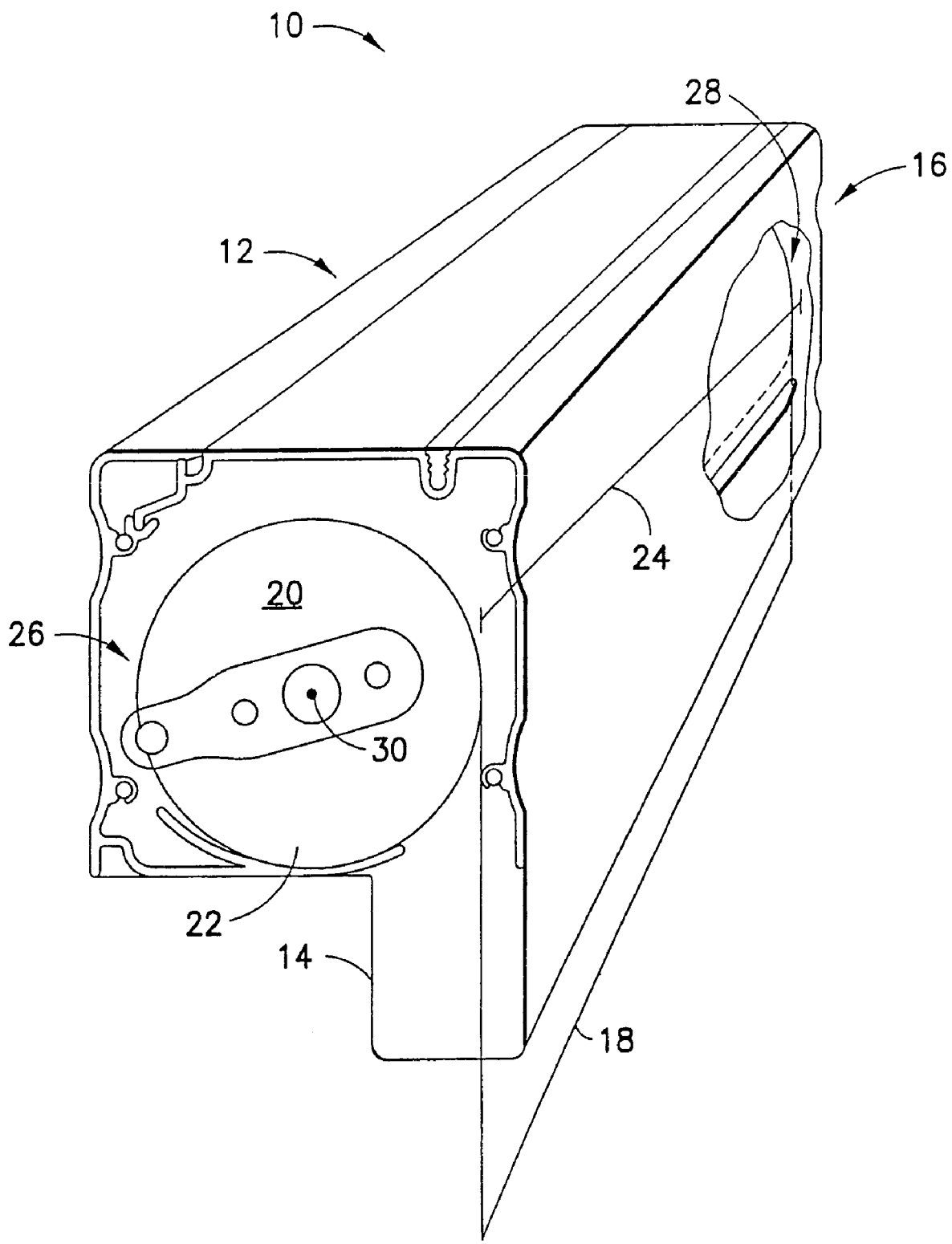
FIG. 1 is a perspective view of an exemplary support mechanism.

FIG. 1 illustrates an exemplary embodiment of the roller tube in a support mechanism 10. The support mechanism 10 includes a housing assembly 12 that extends laterally between a first mount 14 and a second mount 16 opposite the first mount 14. The housing assembly 12 can be mounted on a wall, ceiling, and the like, to provide a stable position to deploy a sheet material 18. The housing assembly 12 can be constructed of a rigid material through various means including, for example, extruded aluminum and the like.

A roller tube 20 is rotatably mounted in the housing assembly 12. The roller tube 20 can be pivotably supported on the first mount 14 and second mount 16. The roller tube 20 includes a body 22 that extends along a length 24 between a first end 26 and a second end 28. The roller tube body 22 can have a cylindrical shape including a circular cross-section extending along the length 24. The roller tube 20 is configured to support the sheet material 18, such as solar screen material. The sheet material 18 can be wound around the roller tube 20 about an axis of rotation (axis) 30 of the roller tube 20. As the sheet material 18 is wound (wrapped) around the roller tube body 22 the diameter of the roller tube 20 and sheet material 18 increases. As the sheet material is unwound, the diameter of the roller tube 20 and sheet material 18 decreases. The sheet material 18 is wound and unwound on the roller tube 20 such that the sheet material remains substantially orthogonal to the axis 30. By remaining in an orthogonal alignment, the sheet material is maintained in a wrinkle free manner. In an exemplary embodiment, the sheet material 18 can be wound around the roller tube 20 about one and a half times to secure the sheet material 18 to the roller tube 20.

Figure 2:
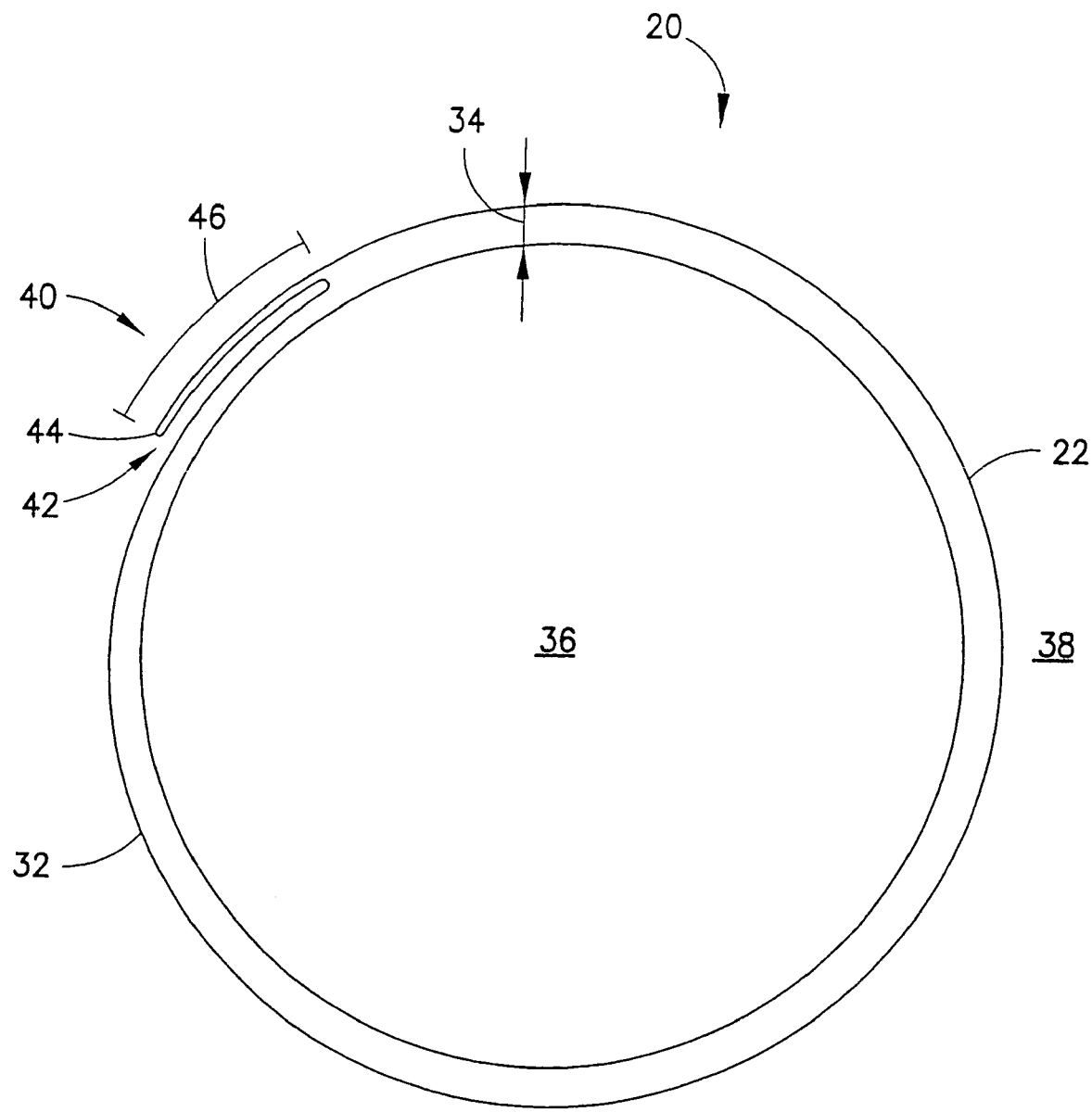
FIG. 2 is a side cross-section view of an exemplary roller tube.

FIG. 2 illustrates a cross-sectional side view of an exemplary roller tube 20. The roller tube body 22 can include a tube wall 32 having a thickness 34. The tube wall 32 defines an interior 36 and an exterior 38 of the tube body 22. The interior 36 of the tube body 22 can be hollow and substantially circular in shape, such that the inside diameter of the tube wall 32 has a circular cross-section. The roller tube 20 can be formed in substantially a cylindrical shape to receive a motor 50 therewithin. The exterior 38 can be substantially circular and configured to receive the sheet material 18 wrapped thereon in a roll about the roller tube 20, as shown in FIG. 1.

The roller tube wall 32 can include a surface feature 40 formed proximate the exterior 38. The surface feature 40 is configured to receive and fix the sheet material 18 about the exterior of the tube body 22. The surface feature 40 is malleable, such that the surface feature 40 can be deformed onto the sheet material to clamp onto and fix the sheet material 18 to the roller tube 20. The surface feature 40 does not change the shape of the interior 36. The surface feature 40 does not create any protrusions into the interior 36 such that the inside diameter of the tube wall 32 can be maintained substantially circular in cross-section/profile. The surface feature 40 is integrally formed from the tube wall 32 and can extend from the first end 26 to the second end 28. In an exemplary embodiment, the surface feature 40 can be formed with the tube wall 32, such as by extrusion.

In an exemplary embodiment, the surface feature 40 comprises a groove 42 formed in the tube wall 32 at the exterior 38 of the tube wall 32. The groove 42 can be formed into the thickness 34 of the tube wall 32. The groove 42 can be formed such that the sheet material 18 inserted into the groove 42 will align orthogonal to the axis of rotation 30. The depth of the groove 42 can be constant along the length 24 or can be varied. The depth of the groove 42 can be greater than the thickness 34 dimension. In an exemplary embodiment, the groove can be about 3/16 inch deep.

Figure 3:
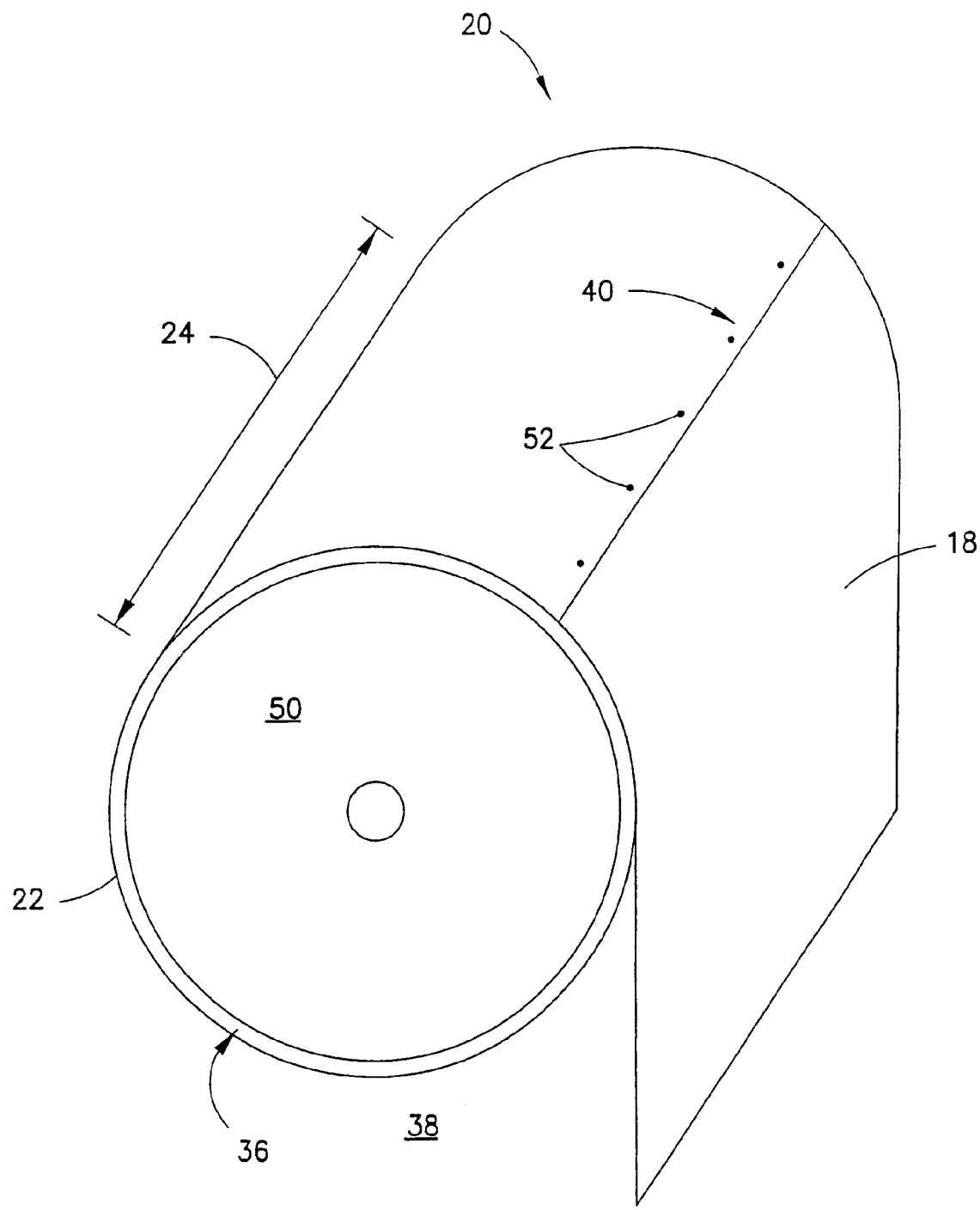
FIG. 3 is a perspective view of an exemplary roller tube.

The surface feature 40 can include a flange 44 extending over at least a portion of the groove 42. The flange 44 can be malleable and thus deformed to fix a sheet material 18 inserted between the flange 44 and the groove 42. Alternatively, the flange 44 can be deformed (e.g., bent) along its entire length to retain the edge of the sheet material 18. The flange 44 can substantially close over the groove 42. The flange 44 can extend the length 24 from the first end 26 to the second end 28. In another exemplary embodiment, the flange 44 can be formed intermittently along the exterior 38, such that the flange 44 does not cover the entire groove 42 along the length 24. The width 46 of the flange 44 can be varied depending on the service requirements of the roller tube 20. The flange width 46 can be greater than the thickness 34 of the tube wall 32. The flange 44 can be pressed against the sheet material 18 along the length 24 at predetermined intervals. In an exemplary embodiment, the predetermined intervals can be from about 3 inches to about 5 inches. The flange 44 can be staked or hammered at the predetermined interval in order to deform the flange 44 onto the sheet material 18, as illustrated at stake points 52 in FIG. 3.

Since the surface feature 40 does not create a protrusion in the interior, a drive motor can be mounted in the interior 36 of the tube body 22 with a snug fit. The drive motor housing can be formed in a substantially circular shape that matches with the interior 36 of the tube body 22. There is no need to modify the drive motor for installation into the exemplary roller tube 20.

Figure 4:
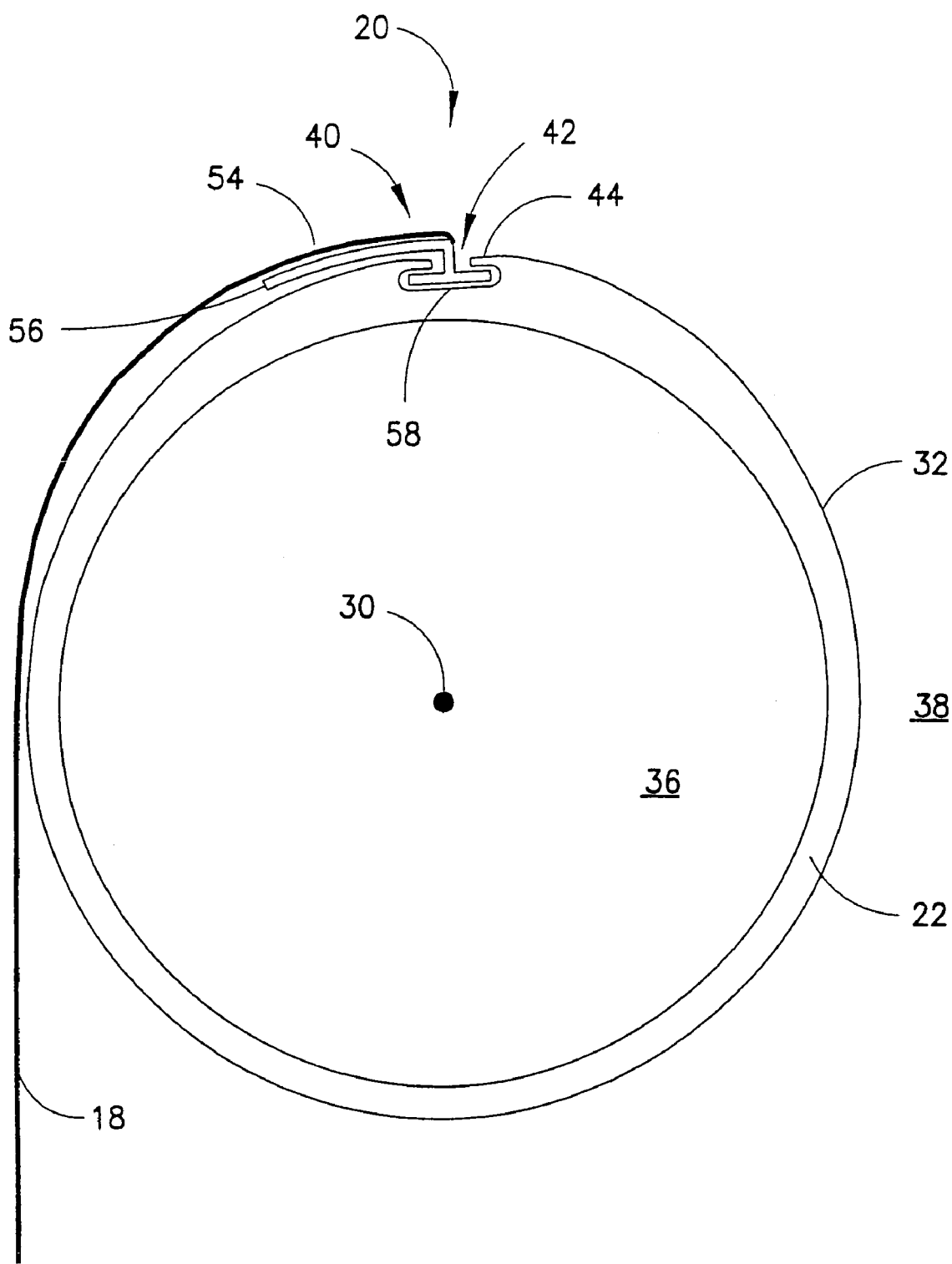
FIG. 4 is a side cross-sectional view of an exemplary roller tube with attachment insert.

Referring to FIG. 4 an exemplary roller tube is illustrated in a cross-sectional view. The roller tube 20 in this exemplary embodiment includes many of the features of the previously disclosed embodiments. The roller tube 20 includes a tube body 22 defining the interior 36 and exterior 38. The tube body 22 includes the tube wall 32 defining the surface feature 40. The surface feature 40 can include at least one flange 44. In the exemplary embodiment illustrated, the surface feature 40 includes two flanges 44 proximate the groove 42. The flanges 44 can extend the length 24 of the tube body 22. In another exemplary embodiment, the flanges 44 can be formed intermittently along the length 24.

The groove 42 can be configured to receive an attachment insert 54 that slides into the groove 42. The attachment insert 54 can be fixed in the surface feature 40 after being inserted. The attachment insert 54 is configured to couple to the sheet material 18 and align the sheet material 18 with the axis 30 of the roller tube 20 such that the sheet material 18 can wind and unwind around the roller tube 20 evenly and without binding. The attachment insert 54 can be configured for insertion into the groove 42 from one of the ends 26, 28 of the tube body 22 and slid axially into a secured position aligning the sheet material 18 with the roller tube 20. The flanges 44 prevent the attachment insert 54 from disconnecting from the groove 42. After insertion, the attachment insert 54 is secured by the sheet material 18 as the sheet material is wound around the roller tube 20. In an optional exemplary embodiment, the flange 44 can be malleable and deformed into a position of interference with the attachment insert 54, thereby binding the attachment insert 54 in the groove 42.

The sheet material can be secured to the attachment insert 54 by means of fasteners, such as sewing the sheet material 18 to the attachment insert 54 and/or by welding (e.g., ultrasonic or hot air weld) the sheet material 18 to the attachment insert 54. The attachment insert 54 allows for alignment of the sheet material 18 to the roller tube 20 with great precision and with minimal assembly time. The sheet material 18 and attachment insert 54 can be coupled together with exact alignment separately before being coupled to the roller tube 20. The sheet material 18 and attachment insert 54 assembly can be easily attached to the roller tube 20 by sliding the attachment insert 54 into the groove 42 from one of the first or second ends 26, 28.

The attachment insert 54 includes an attachment portion 56 configured to attach to the sheet material 18. The attachment portion 56 can be located proximate the exterior 38 of the roller tube body 22. The attachment portion 56 is coupled to an insert portion 58 of the attachment insert 54. The insert portion 58 can be configured with a shape for insertion in the surface feature 40 and coupled therein. The insert portion 58 can have a profile that is shaped similar to the groove 42 and held into the groove 42 by the flanges 44. In an exemplary embodiment, the attachment insert 54 comprises a polyvinyl chloride material or other similar material having properties allowing for the attachment insert 54 to bind to the sheet material 18 as well as securely insert into the surface feature 40. It should be appreciated that the attachment insert 54 could alternatively be fabricated from any other suitable material, such as other plastics, aluminum, or the like.

The exemplary roller tube disclosed herein provides the advantage of fixing a sheet material (solar screen material, movie screen material, decorative material, or the like) to the exterior of the roller tube body in a substantially perpendicular fashion without creating a protrusion in the interior of the roller tube body. The exemplary roller tube also allows for the material to accurately and quickly attach to the roller tube body with the correct alignment. With the exemplary roller tube, a drive motor can be mounted to the interior of the roller tube body without being modified. A tight engaging fit can be achieved between the drive motor and the interior of the roller tube body because the surface feature does not require any protrusions into the interior.

Figure 5:
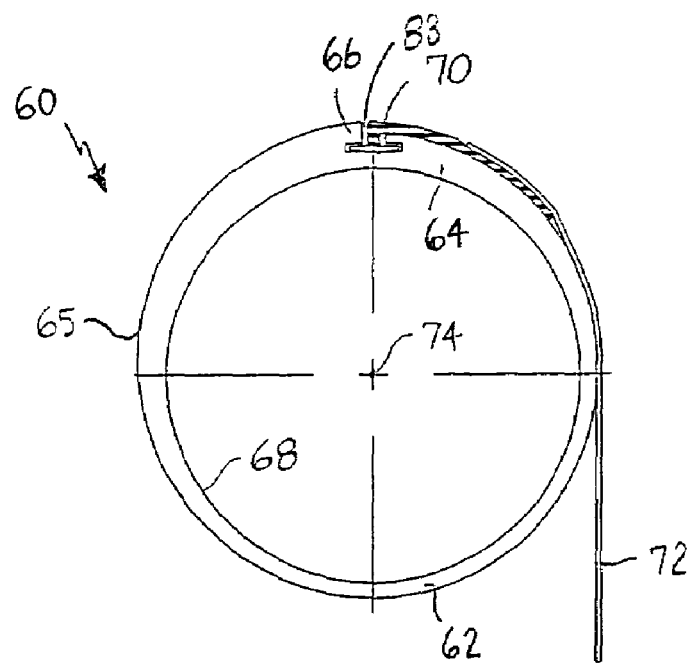
FIG. 5 is a cross-sectional view of a roller tube having a lip for allowing the attachment insert and sheet material to be maintained flush with the exterior surface of the roller tube.
Figure 6:
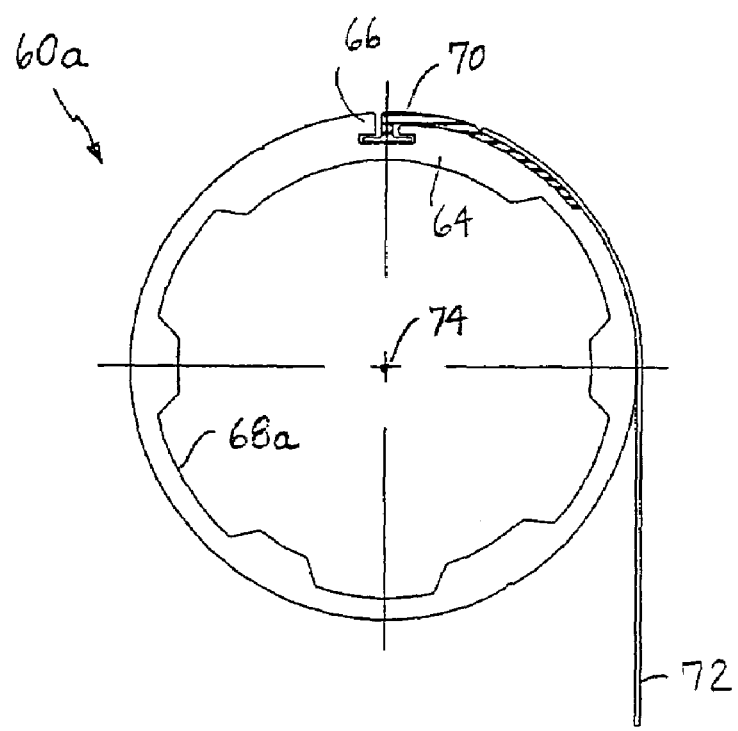
FIG. 6 is a cross-sectional view of another embodiment in which the roller tube has a lip for allowing the attachment insert and sheet material to be maintained flush with the exterior surface of the roller tube.
Figure 7:
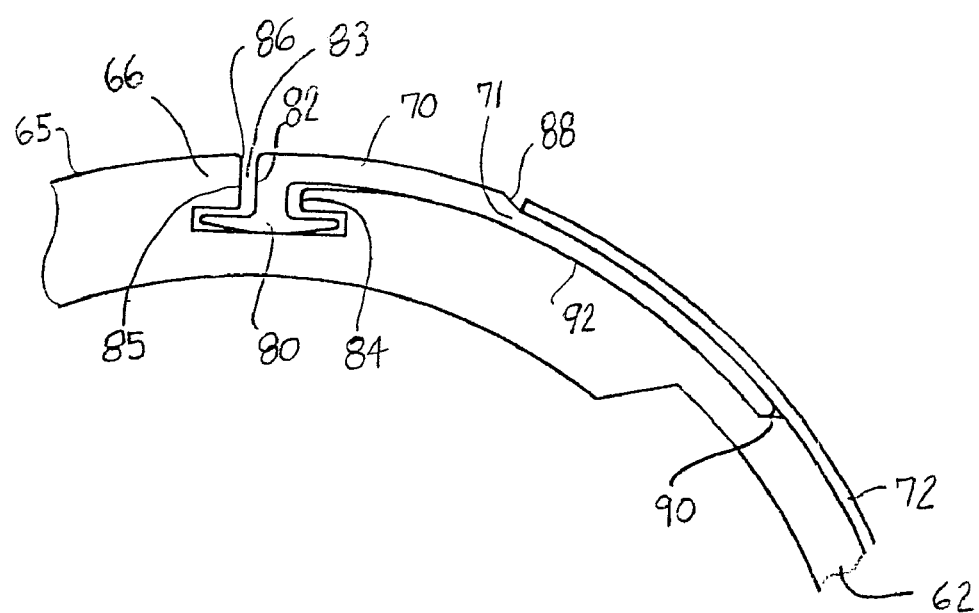
FIG. 7 is an enlarged, partial cross section of the embodiment of FIG. 7, showing the channel, roller tube lip, attachment insert and sheet material in greater detail.

FIGS. 5-7 illustrate additional embodiments in which the exterior of the roller tube includes a lip and the attachment insert is undercut on an outer surface thereof to which a sheet material is attached. The undercut allows the sheet material to be mounted flush with the outer surface of the attachment insert. The exterior of the roller tube can also include a notch extending away from the lip toward a step in the exterior surface. The step defines the end of the notch. The notch allows the attachment insert to be mounted flush with the exterior surface of the roller tube. Since the material is flush with the attachment insert, and the attachment insert is flush with the exterior surface of the roller tube, the material can be smoothly wound around the roller tube without any bumps being formed in the material.

The embodiment of FIG. 5 provides a roller tube 60 that has a cylindrical interior surface 68. The cylindrical interior is useful to snugly hold a drive motor (not shown) with a matching cylindrical exterior. As can be seen, the wall 62 of the roller tube varies in thickness. A relatively thick section 66 is provided to accommodate the formation of a channel 83 therein, as best illustrated in the enlarged view of FIG. 7. Due to the varying thickness of the tube wall, the exterior of the roller tube has an eccentric shape about the longitudinal axis 74. The interior, however, has a circular cross section about the axis 74. An attachment insert 70 is received in the channel 83, e.g., by sliding the broad portion 80 and leg 82 of a T-shaped head of the attachment insert 70 into the channel 83. It should be understood that the T-shaped channel shown is only an example of a shape that can be implemented, and many other shapes are possible for the channel and corresponding portion of the attachment insert, as will be appreciated by those skilled in the art. Moreover, it should be appreciated that the structure of the present invention allows channel 83 to be fabricated much smaller than in prior art designs. This has the advantage that the wall thickness can be substantially reduced, even in the area where the channel resides. By providing a smaller wall thickness, a smaller diameter roller tube and smaller housing assembly can be provided, resulting in a much more compact design than has heretofore been possible.

The eccentric shape of the roller tube, as shown in FIG. 5, provides various advantages. For example, it reduces the weight and cost of the roller tube, since less material is used than if a greater constant wall thickness were maintained all around the tube. It also allows a smaller outer diameter tube for accommodating a given length of sheet material wrapped therearound. The inventive structure is particularly advantageous in that the roller tube allows more sheet material to be accommodated in a smaller housing (e.g., housing assembly 12 of FIG. 1) than prior art roller tubes.

As best seen in FIG. 7, the channel 83 includes a first side wall 84 and a second side wall 85. The second side wall 85 extends further away from the axis 74 of the roller tube than the first side wall extends. In this manner, a lip 86 is created in the exterior surface 65 of the roller tube. The lip extends exactly (within normal tolerances) as far as the leg 82 of the T-shaped attachment insert head, so that the attachment insert will be flush with the exterior surface 65 of the roller tube, at least in the vicinity of lip 86. The exterior surface 65 can also be provided with a edge 90, defining a notch 92 that extends from the outermost point of first side wall 84 to the edge 90. This notch accommodates the tail 71 of attachment insert 70 such that the tail is flush with the exterior surface 65 of the roller tube. The tail 71 of attachment insert 70 is undercut starting at bevel 88, to accommodate a sheet material 72 affixed thereto. In this manner, the sheet material can be mounted flush with the outer surface of the attachment insert. The sheet material 72 can be affixed to the undercut portion of the attachment insert by any conventional means, such as by an adhesive, a tape, ultrasonic welding, and the like. If a tape or thick adhesive is used, its thickness must be taken into account when establishing the proper depth of the undercut portion. In this manner, the stacked thickness of the tape or adhesive and the sheet material can be established to result in the sheet material being flush with the outer surface of the attachment insert.

The structure of FIG. 6 is similar to that of FIG. 5, except that the roller tube 60a has an interior portion 68a of varying shape, instead of the circular shape shown in FIG. 5. This shape accommodates a particular motor housing with a complimentary outer shape. For example, some motors (such as low torque direct current (DC) motors) have couplers that will mate with the interior tube shape shown in FIG. 6.

The structure illustrated in FIGS. 5-7 provides many advantages. These include the compact design mentioned above, that allows more sheet material to be fit into the roller tube housing. Thus, a smaller and less obtrusive housing can be used for a given length movie screen, solar shade, or the like. In addition, the flush mounting of the attachment insert and material attached thereto avoids bumps as the sheet material is rolled around the roller tube. This prevents wrinkles and other noticeable defects from forming in the sheet material, that would be visible when unwound. The channel for accommodating the attachment insert, such as the example T-shaped channel shown, makes it easy to accurately attach the sheet material to the roller tube.

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A roller tube comprising:
   a tubular wall having a longitudinal axis and including a first end and a second end opposite said first end, said tubular wall having a generally cylindrical inner surface with a circular profile coaxial with said axis and a generally cylindrical exterior surface that is not coaxial with said axis, resulting in said tubular wall having a progressively varying thickness along its circumference;
   a channel running longitudinally in said exterior surface of said tubular wall where the tubular wall is relatively thick, said channel being configured to receive an attachment insert for sheet material; and
   a motor having a substantially circular outer shape snugly received in said circular profile.

2. The roller tube of claim 1 wherein said channel extends substantially from said first end to said second end.

3. The roller tube of claim 1 wherein:
   said channel is generally T-shaped and comprises first and second side walls that extend from an interior portion of said tubular wall toward said exterior surface, said second side wall extending further away from said axis than said first side wall to create a lip in said exterior surface, said T-shape being formed by a broad portion at said interior portion with a leg extending therefrom toward said exterior surface.

4. The roller tube of claim 3 wherein the leg of said T-shaped channel extends away from said axis, and is longer on one side thereof to provide said lip.

5. The roller tube of claim 4 wherein said lip extends beyond the portion of said exterior surface that adjoins said first side wall by an amount adapted to accommodate the leg height of a T-shaped attachment insert when inserted in said channel.

6. The roller tube of claim 4 wherein said lip extends beyond the portion of said exterior surface that adjoins said first side wall by an amount adapted to accommodate the height of a corresponding attachment insert, such that the attachment insert is flush with said exterior surface when inserted in said channel.

7. The roller tube of claim 1 in combination with an attachment insert in said channel.

8. The roller tube of claim 7 further comprising:
a sheet material attached to said attachment insert.

9. The roller tube of claim 8, wherein said channel and attachment insert have complimentary T-shapes.

10. The roller tube of claim 8 wherein said attachment insert is undercut on an outer surface thereof to which said sheet material is attached, said undercut allowing said sheet material to be mounted flush with said outer surface.

11. The roller tube of claim 1 further comprising a notch in said exterior surface extending away from said channel toward a step in said exterior surface, said step defining the end of said notch, said notch allowing said attachment insert to be mounted flush with said exterior surface.

12. The roller tube of claim 11 in combination with said attachment insert in said channel and a sheet material attached to said attachment insert.

13. A method for attaching a sheet material to a roller tube, comprising:
providing a roller tube having a tubular wall with a longitudinal axis, said tubular wall having a generally cylindrical inner surface with a circular profile coaxial with said axis and a generally cylindrical exterior surface that is not coaxial with said axis, resulting in said tubular wall having a progressively varying thickness along its circumference;
mounting a motor having a substantially circular outer shape within said circular profile:
providing a channel running longitudinally in a relatively thick portion of said exterior surface, said channel being configured to receive an attachment insert for sheet material;
providing said channel with first and second side walls that extend from an interior portion of said tubular wall toward said exterior surface, said second side wall extending further away from said axis than said first side wall to create a lip in said exterior surface;
mounting said attachment insert in said channel flush with said exterior surface; and
attaching a sheet material to said attachment insert in a manner that allows the sheet material to be wound around the roller tube without causing a bump in the material in the vicinity of the attachment insert.

14. The method of claim 13 wherein said channel and attachment insert have complimentary T-shapes.

15. The method of claim 14 wherein said mounting step comprises sliding the T-shaped attachment insert into the T-shaped channel.

16. The method of claim 13 wherein said sheet material is ultrasonically welded to said attachment insert.

17. The method of claim 13 wherein said sheet material is sewn or adhesively affixed to said attachment insert.

* * * * *